April 18, 1967  W. E. DOERING ET AL  3,314,450
TRANSPARENT REINFORCED GLASS PIPE
Filed Aug. 5, 1963
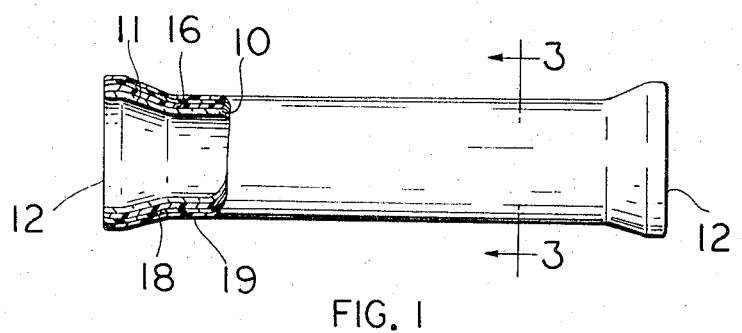
FIG. 1
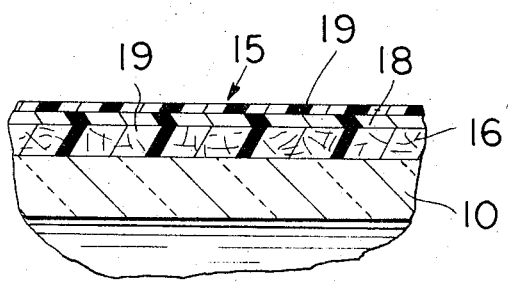
FIG. 2
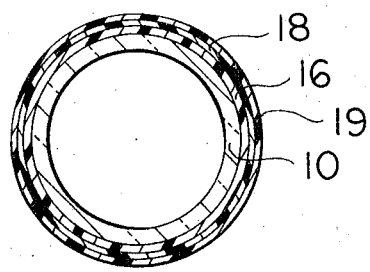
FIG. 3
FIG. 4
INVENTORS
WILLIAM E. DOERING
BY ROBERT R KEGG
*E J Holler & W A Schaich*
ATTORNEYS 3,314,450
TRANSPARENT REINFORCED GLASS PIPE
William E. Doering and Robert R. Kegg, Toledo, Ohio, assignors to Owens-Illinois Inc., a corporation of Ohio
Filed Aug. 5, 1963, Ser. No. 299,933
12 Claims. (Cl. 138—146)

This invention relates to glass pipe and more specifically to transparent reinforced glass pipe and fittings which are strengthened and protected against damage due to mechanical, physical and thermal shock.

The subject application constitutes a continuation-in-part of our earlier-filed copending application, Ser. No. 263,915, filed Mar. 8, 1963, having the same title, and now abandoned.

Reinforced glass pipe and fittings have found greater acceptance and more widespread use in recent years and are commonly referred to as armored glass pipe. Since glass is known to be an ideal material for transporting fluids which attack or are discolored or contaminated by conventional metal or plastic pipe, the transparency, non-corrosive nature and smoothness of glass pipe provide properties of particular utility in conveying fluids. However, unprotected glass pipe even when tempered has been found to be subject to abuse while in certain forms of service, and its primary application has been where it is exposed to view and its frangible character can be appreciated.

Heretofore, armored glass pipe has normally been fabricated of woven cloth or sleeve-like fibrous material which surrounds the exterior surfaces of the pipe section and is bonded thereto by an integral coating of plastic material filling the interstices of the fibrous material. In such product the light-transmission characteristics can at best be described as translucent and the pipe is completely lacking in adequate transparency or clearness to permit full observation and examination of internal surfaces and conveyed fluids. The present invention obviates the disadvantages of prior art constructions and provides fully transparent glass pipe having substantial impact resistance.

Accordingly, the present invention relates to a highly-transparent reinforced glass pipe having coated rupture-resistant exterior surfaces and having light-transmission and clarity.

Another object of this invention is the manufacture of fibrous reinforced glass piping which is structurally strong and having considerable lucidity.

Another object of this invention is the manufacture of reinforced glass pipe and fittings having outer surfaces consisting of optically-matched polymerized unsaturated polyester resin and glass fibers integrally bonded to the glass surfaces.

Another object of this invention is to provide a composite strengthened fully-transparent tubular glass product having at least two exterior coatings of reacted synthetic resin containing material with an intermediate layer additionally containing a minor amount of relatively short-length optically-matched fibers.

An additional object of this invention is to provide strengthened glass pipe having improved light-transmission characteristics and of accomplishing such improved characteristics in a manner such that the exterior surfaces of the glass pipe are covered with at least two integrally-bonded transparent layers of thermoset synthetic resin containing material, and in such manner that the intermediate layer of thermoset synthetic resin containing material contains relatively short-length glass fibers fully embedded therein, and in such further manner that the named materials comprising the several layers possess indices of refraction complemental to the parent glass pipe.

The specific nature of this invention, as well as other objects and advantages thereof, will become apparent to those skilled in the art from the following description taken in conjunction with the annexed sheet of drawings on which, by way of preferred example only, is illustrated the preferred embodiments of this invention.

In the drawings, wherein like numerals are employed to designate like parts throughout the same:

FIG. 1 is a side view partly in vertical section of a pipe section fabricated in accordance with the present invention;

FIG. 2 is an enlarged fragmentary vertical sectional view of a sidewall portion of the pipe section shown in FIG. 1;

FIG. 3 is a vertical sectional view of the pipe section taken along the line 3—3 of FIG. 1; and FIG. 4 is a schematic diagram of a process for fabricating the pipe section in accordance with our invention.

Referring to the drawing, a glass tube 10 having a basically cylindrical shape with outwardly-flared thickened flange portions 11 at opposite ends is provided for subsequent reinforcement. The flange portions 11 at opposite ends of the tube 10 taper exteriorly to form an inclined shoulder which terminates in a transverse sealing surface 12 normally having a greater width than the tube sidewall thickness. Sealing surface 12 is preferably planar and provided with an annular groove (not shown) to facilitate the seating of an annular gasket member frequently utilized in sealing together juxtaposed ends of similarly-flanged glass pipe sections and glass fittings. Alternately, sealing surface 12 may be substantially planar or convexly-curved as known in the art.

Tube 10 is generally comprised of borosilicate glass such as Kimble Glass No. KG–33 which will operate at temperatures up to 450° F. or higher and is tempered to provide heat shock resistance. The glass may be either tempered to impart substantial mechanical strength and resistance to impact damage or annealed to relieve stresses therein. Glass tube 10 may be fabricated of clear transparent glass of widely varying composition, although borosilicate glass is known to be of particular utility in the form of glass pipe for use in the food, beverage and chemical processing industries as well as laboratory and research facilities. One form of glass tube is the referenced KG–33 borosilicate glass having an index of refraction of 1.47, density of 2.23 grams per cc., a coefficient of thermal expansion (0–300° C.) of $32 \times 10^{-7}$ ° C. and a chemical durability factor of 0.26 ml. of N/50 $H_2SO_4$, U.S.P. XVI.

Straight pipe section 10 is taken for reinforcement by mounting a support plug in each end with both plugs being mounted on a coaxially disposed rod or shaft for rotation. Sealing surfaces 12 at each end are protected as by the application of a thin layer of paraffin wax or pressure-sensitive masking tape. No pretreatment of the pipe exterior surfaces is required, although, depending upon the selection of coating materials, a primer may be applied as required or desired.

The first coating or layer of reinforcement material designated by the numeral 16 consists of a synthetic thermosetting resin such as pre-polymerized unsaturated polyester resin monomers and chopped glass fibers which are applied over the tube exterior surfaces extending fully co-extensively therewith.

The glass fibers may vary from about 0.5 to 1.0 inch in length and preferably have an average length of about 0.75 inch with a diameter up to about 0.001 inch. Glass fibers comprised of Owens-Corning Fiberglas Corp. "E" glass and having an index of refraction of about 1.549 (at 550 millimicrons and 32° C.) and transparent clarity are preferred. "E" glass is a borosilicate glass composition ranging from about 52–56% silicon dioxide, 16–25% calcium oxide, 12–16% aluminum oxide, 8–13% boron oxide, 0–1% sodium and potassium oxides and 0–6% magnesium oxide. Filaments obtained in the form of continuous roving, and particularly Owens-Corning Fiberglas Corp. Product No. 851 fine strand having a chrome-silane sizing, are preferred. The fibers may also have a No. 114, Volan or Volan A finish as described on page 41 of the publication, "Textile Fiber Materials for Industry," published by Owens-Corning Fiberglas Corp., dated June 1961. Volan is a trade name for a Werner-type chromium complex (methacrylato chromatic chloride) in isopropanol and is utilized as a bonding agent applied to glass fibers to improve the adhesion between glass and resin. The aforesaid finishes on the fibers provide excellent wet-out of the plastic resins during various laminating processes.

A preferred composition useful in the present invention consists essentially of a thermosetting resinous material such as crystal clear linear polyester resin used for casting and encapsulating purposes. The first-applied layer or coating includes 10 to 30 percent, and preferably from 17 to 20 percent, based on the weight of the composition, of short pieces of glass fibers substantially uniformly dispersed throughout the solid thermoset material.

A clear thermoset resin found to have properties of particular value for use in the present invention consists of Product No. 1960A, an unsaturated polyester resin manufactured and distributed by the Finishes Division of Interchemical Corp., Cincinnati, Ohio. This product is a crystal clear polyester resin containing 72% solids and 28% styrene, having a viscosity of 3100 to 3800 centipoises at 26° C., and is basically comprised of the monomer styrene having a weight of 9.6 pounds per gallon. This product has a refractive index of 1.540, excellent optical properties and good clarity. This product is comparable to Product No. 1360 of Interchemical Corp., a polyester casting resin described in its Bulletin No. 12–1 published February 1962. Other polyester resins containing up to 35% styrene and having refractive indices such as 1.5410 before cure and 1.5560 after cure, for example, are also utilizable in the present invention.

The selected unsaturated polyester resin is diluted with styrene monomer in one embodiment of the invention in order to obtain better spraying characteristics. A 10 percent by weight addition of styrene is preferred. An accelerator or promoter such as 6% cobalt naphthenate is added to the styrene diluted resin. This general purpose accelerator is used with a methyl-ethyl-ketone peroxide catalyst to give a fast cure to the polyester resin at room temperature. The accelerator is added in the amount of up to .70% by weight of accelerator to the diluted resin. The resin with the styrene and accelerator additions is introduced into a spray gun from a pressurized tank.

A flexibilizer or flexible polyester resin, such as Product No. 1612 distributed by Interchemical Corp., is added to the stated formulation in an amount ranging from 15 to 50%, by weight, to provide a more flexible resin system capable of withstanding severe temperature changes as low as −20° F. without stress-cracking due to thermal effects. A preferred addition consists of 25 percent by weight flexibilizer having a very low unsaturated acid content and rather high styrene dilution to develop optimum tensile strength in the polymerized resin.

The catalyst consists of 60% methyl-ethyl-ketone peroxide in dimethyl phthalate. This product consists of one part methyl-ethyl-ketone peroxide to two parts diallyl phthalate to increase the volume to provide more accurate metering. The diluted catalyst is fed to the spray gun from a separate pressurized tank and about 3.0% catalyst is utilized based on the weight of resin.

Unsaturated polyesters are linear polyester resins based on dibasic acids and dihydric alcohols capable of cross-linking with vinyl monomers such as styrene to form thermoset copolymers.

The monomer component of the polyester resin reacts with the unsaturated groups in the polyester chains to form a cross-linked, thermoset polymer. Converting the polyester resins from the liquid to the solid state involves a copolymerization or addition reaction wherein no volatile by-products are released. The catalyst decomposes into highly-active free radicals which serve to promote free-radical type reactions and attendant polymerization throughout the entire mass of material. Thus, the free radicals to which the catalyst decomposes become a part of the polymer network and, therefore, the catalyst is not recovered as in the case of a true catalyst. The addition polymerization is promoted by initiators such as peroxides. Inhibitors are generally included to provide storage stability and to control the polymerization reactions.

As stated above, glass tube 10 mounted on a rotatable shaft with its ends plugged and masked is positioned in a spray booth preferably in horizontal relation. Diluted resin and accelerator are retained in a first pressurized tank at a pressure of about 40 to 45 p.s.i. gauge while the catalyst is maintained in a second pressurized tank at a pressure of about 30 p.s.i. gauge. The continuous glass fiber roving is fed into one side of a multiple-orifice spray gun while the resin system and catalyst are fed into another orifice of the same spray gun. Examples of spraying apparatus and methods of delivering the resin system and glass fibers onto the workpiece are disclosed in U.S. Patents Nos. 2,787,314 and 2,933,125 to Anderson, issued April 2, 1957, and April 19, 1960, respectively. Such apparatus is capable of cutting glass fiber roving into short lengths while separating the constituent ends of each cut section from each other and coating the cut fibers with the plastic bonding material during its delivery onto a workpiece. The combined fibers and plastic material are delivered onto the exterior surfaces of pipe section 10 during its axial rotation to form a continuous layer 16 starting at one end and proceeding at a uniform rate to the other end. The applied material exhibits a feathery appearance as deposited exteriorly from the deposited material. Mixing of the resin, catalyst and chopped fiber takes place externally of the gun between its several orifices and the rotating pipe. Total material delivered by the gun onto the pipe surfaces is approximately two pounds per minute, for example, which amount is slightly increased or decreased for coating different pipe diameters. Also the speed of rotation of the pipe is varied for different pipe diameters to obtain substantially the same coating thickness of the various sizes. Typical rotation speeds for various pipe internal diameters include the following: 1 inch diameter — 120 r.p.m.; 3 inch diameter — 50 r.p.m.; and 6 inch diameter — 30 r.p.m.

A rotatable cylindrical roll such as a mohair paint roller or a serrated metallic roller dipped in styrene monomer is immediately applied to the first layer or coating 16 with slight pressure to force the tangentially-projecting cut fibers into contact with the deposited plastic material. All exterior surfaces of the article which are completely coated between the masked transverse sealing surfaces 12 are similarly rolled. Utilizing the monomer styrene on the roller prevents the deformable resin and fibers from being pulled from the pipe surfaces. The synthetic resin and cut fibers 17 are evenly distributed over the exterior surfaces and uniform pressure is applied to the roller to force the feathery projecting portions of the fibers into full contact with the adhered resin. The first layer 16 is thus applied having a thickness ranging from about $\frac{1}{32}$ to $\frac{1}{4}$ inch depending upon the particular external dimension and wall thickness of the pipe section. The section is preferably continually rotated during initial stages of curing for a period of about 10–15 minutes to maintain a uniform coating thickness until gelation of the resin system is complete.

The coated section is cured either in air or by the application of heat and during an intermediate portion of the curing period, the end surfaces of the pipe section are annularly trimmed to eliminate the coating therefrom. A knife edge is utilized to sever excess end portions of the first coating 16 from projecting beyond sealing surfaces 12. First coating 16 is cured over a period ranging from 30 minutes to several hours following which time the resin system becomes solidified and hardened with only slight residual tackiness.

Following curing of the first coating, a second coating 18 of the same thermoset polyester resin is applied. Second coating 18 consists of the resin only without the introduction of glass fibers and has a substantially lesser thickness than coating 16. The second coating may have a thickness ranging up to about ⅛ inch or preferably less than about one-half the thickness of the first coating. The second coating serves to embed fully all exteriorly projecting portions of glass fibers and to submerge the same within the resin system. A different type of spray gun from those disclosed in the named patents and capable of atomizing the resin into minute particles or droplets is preferred for the second coating 18 in order to obtain a smooth uniform exterior surface. The second coating is preferably applied at the rate of about one-third pound per minute. The pipe section is continually rotated as described above during the application of second coating 18 and during preliminary stages of its gelation. The rotation during gelation maintains the flowable thermoset resin in the form of a uniform layer and prevents gravitational effects from causing the resin to flow downwardly into locally thickened areas. When the resin system has been at least partially polymerized and cured, the end surfaces of the pipe section are again annularly trimmed as by a knife edge to eliminate axially projecting end portions. The trimmed portions consist of material which extends axially beyond end surfaces 12.

After preliminary curing for a relatively brief period of about 30 minutes, a third and finishing coating 19 is applied over second coating 18 extending fully coextensively therewith. Exterior coating 19 consists of polyvinyl acetate which is applied as a thin film over polyester resin layer 18 to eliminate its inherent tackiness in use. A solution containing about 10% polyvinyl acetate and about 90% ethanol by weight is prepared and sprayed over coating 18 during continuous rotation of the pipe section. The ethanol serves as a carrier for the polyvinyl acetate to facilitate its application. Coating 19 is applied at ambient temperature and provides a covering film to maintain polyester resin coating 18 free from atmospheric effects.

Air and moisture in combination with adverse thermal conditions result in their reaction with the polyester resin, when unprotected, causing the combined coating to exhibit physical properties of being sticky or tacky. Such condition causes the plastic coating to be tacky to touch and results in the adherance of dirt particles. The overcoat 19 of polyvinyl acetate eliminates tackiness of the multi-layer coating and provides good optical clarity. The thickness of coating 19 is varied as desired or required, however, a minimum thickness of about .005 to .010 inch is preferred. Good optical properties through the combined coating with no appreciable change in the clarity or light transmission is obtained. While the polyester coating 18 can be cured in long periods of time without coating 19, the latter is applied to minimize curing time and provide permanently tack-free surfaces.

Polyvinyl acetate is a colorless, transparent synthetic resin derived from polymerization of vinyl acetate with peroxide catalysts and provides a protective film over the subject polyester resin and glass fibers. Polyvinyl acetate has a refractive index ranging from 1.52 to 1.55 which compares favorably with the R.I. values of the polyester resin of 1.540 and the glass fibers of 1.549.

The reinforced pipe section consists of a multilayered plastic coating integrally bonded to and fully contiguous with the exterior surfaces of the pipe section. It will be readily appreciated how the second and third layers serve to give transparency to the first coating. Embedding the optically-matched glass fibers within the resin system serves to virtually eliminate their individual identity and perception within the reinforcing layers. With the reinforcing layers properly applied, very few of the fibers are capable of observation and the interior surfaces of the pipe section are readily observable. Where the several coatings have a combined thickness ranging from about ½₂ to ⅜ inch and are applied in accordance with the foregoing description, both conveyed fluids and internal surfaces of the pipe section are clearly visible due to the clearness and transparency of the reinforcing layers. In the above-described embodiment of the present invention, the composite single sidewall of the reinforced pipe section has an index of refraction of about $1.495 \pm .005$ for a glass thickness of 0.125 inch and a coating thickness of 0.042 inch.

Optically matching the transparent components of the exterior protective layers to the parent glass provides economical reinforcement of the latter without loss of optical resolution. In the event of failure of the reinforced pipe section in service, the coating serves to retain glass fragments together with a minimum loss of the contents within the pipe section until the line can be shut off and drained, and the section replaced.

The reinforcing coating serves to protect the glass pipe section against accidental breakage due to physical or thermal shock. The coating cushions the force of physical impacts delivered to exterior surfaces and moderates the effect of thermally-induced stresses between interior and exterior surfaces of the glass pipe. The surface of the glass is thus exteriorly protected to avoid the formation of flaws or surface defects while in service. The combined glass fiber-plastic coating provides an armoring capable of withstanding severe and repeated thermal and physical shock with high transparency.

Various modifications may be resorted to within the spirit and scope of the appended claims.

We claim:

1. A transparent reinforced pipe section comprising a glass tube, a first coating composed of synthetic resinous material and glass fibers enveloping said glass tube and disposed essentially coextensively with the exterior surfaces thereof, and a second coating of synthetic resinous material enveloping said first coating, said first and second coatings having indices of refraction complemental to said glass tube and cooperating therewith to render said pipe section transparent.

2. A transparent reinforced pipe section in accordance with claim 1, wherein at least one of said coatings of said synthetic resinous material comprises polyester resin.

3. A transparent reinforced pipe section in accordance with claim 1, wherein said glass fibers comprise substantially short-length roving disposed at random within said first coating.

4. A transparent reinforced pipe section in accordance with claim 1, wherein said first coating has a substantially greater thickness than said second coating, the latter having sufficient thickness to fully embed the glass fibers of said first coating.

5. A transparent reinforced pipe section in accordance with claim 1, wherein said first coating comprises about 17 to 20 percent by weight glass fibers and the remainder reacted thermosetting polyester resin.

6. A transparent reinforced pipe section in accordance with claim 1, including a third coating of transparent plastic material comprising polyvinyl acetate extending fully coextensive with said first and second coatings.

7. A transparent reinforced pipe section in accordance with claim 1, wherein said glass tube consists of tempered borosilicate glass having an index of refraction of about 1.47.

8. A transparent reinforced pipe section in accordance with claim 1, including a thin solidified exterior layer surrounding and enclosing said first and second layers, said exterior layer being composed of polyvinyl acetate and providing a transparent tack-free protective film having an index of refraction complemental to said other layers.

9. A composite transparent reinforced glass pipe comprising a glass tube having outwardly-flared exterior surfaces at its ends and essentially uniform internal surfaces throughout its length, a first-applied adherent coating of randomly-disposed relatively short-length glass fibers bonded in a polymerized unsaturated polyester resin containing material disposed essentially coextensive with the exterior surfaces of said glass tube, a second-applied adherent coating of polymerized unsaturated polyester resin containing material surrounding and fully embedding the glass fibers of said first coating, a last-applied adherent coating of polyvinyl acetate containing material extending fully coextensive with said first and second coatings, said glass tube having an index of refraction of about 1.47, said first, second, and third coatings having indices of refraction sufficiently complemental to said glass tube to render said composite glass pipe transparent.

10. A transparent reinforced pipe section in accordance with claim 1, with said first and second coatings having a combined thickness ranging up to about 3/8 inch.

11. A transparent reinforced pipe section in accordance with claim 10, with said first coating having a thickness ranging up to about 1/4 inch in thickness and said second coating having a thickness about one-half the thickness of said first coating.

12. A transparent reinforced pipe section in accordance with claim 10, with said first coating having a thickness from about 1/32 to 1/4 inch in thickness and said second coating having a thickness about one-half the thickness of said first coating.

References Cited by the Examiner

UNITED STATES PATENTS

| | | | |
|---|---|---|---|
| 1,727,937 | 9/1929 | Randall | 161—194 X |
| 2,557,786 | 6/1951 | Johannson | 117—72 |
| 2,606,574 | 8/1952 | Lefebvre | 138—141 X |
| 2,742,931 | 4/1956 | Granahl | 138—144 |
| 2,787,555 | 4/1957 | Drummond. | |
| 2,870,793 | 1/1959 | Bailey | 138—41 |
| 2,976,889 | 2/1961 | Cannady | 138—41 |
| 3,007,809 | 11/1961 | Chadwick | 117—72 |
| 3,157,607 | 11/1964 | Bassin | 117—124 X |

LAVERNE D. GEIGER, *Primary Examiner.*

L. J. LENNY, T. L. MOORHEAD, *Assistant Examiners.*